2,888,498

PRODUCTION OF COLORLESS EMULSION-POLYMERIZED POLYMERS

James H. Carroll and John A. Runberg, Borger, Tex., assignors to Phillips Petroleum Company, a corporation of Delaware No Drawing. Application February 29, 1956
Serial No. 568,444

8 Claims. (Cl. 260—680)

This invention relates to a process for producing emulsion-polymerized polymers which are substantially colorless. In another aspect, this invention relates to a process for removing color from polymers prepared by emulsion polymerization. In still another aspect, it relates to emulsion polymerized polymers which have been rendered substantially colorless. In one of its more specific aspects, it relates to a process for removing color from liquid polymers prepared by emulsion polymerization of conjugated dienes.

Polymers prepared by an emulsion polymerization process have a tendency to be dark colored. The removal of this color is a serious problem in many applications, such as in the manufacture of decorative articles and certain coatings, where a dark color in the product is highly undesirable. It is with the removal of color in such polymers that this invention is concerned.

We have found that a marked color improvement is effected in emulsion prepared polymers by contacting a solution of the polymer with an adsorbent such as silica gel, sodium aluminate, activated charcoal, kaolin, or the like. This was quite unexpected as a similar treatment of sodium-catalyzed, mass-polymerized polymers resulted in very little or no color improvement. We have also found that removal of water from the polymer solution before contacting it with the adsorbent increases the capacity of the adsorbent and improves the color of the final product.

It is an object of this invention to provide a method for producing emulsion polymerized polymers which are substantially colorless.

It is another object of this invention to provide a method for removing color from emulsion polymerized polymers.

It is another object of this invention to provide an emulsion polymerized polymer which is substantially colorless.

Another object of this invention is to provide a method for treating a liquid polymer prepared by emulsion polymerization of a conjugated diene and thereby obtain a clear, transparent, substantially colorless product.

Still another object of this invention is to provide a method for producing a water white, emulsion polymerized, liquid butadiene homopolymer or copolymer.

Still another object of this invention is to provide a method for removing color from solutions of emulsion-polymerized polymers using an adsorbent material wherein the effective capacity of the adsorbent is extended by predrying the polymer solution.

Other objects and advantages of the present invention will become apparent to those skilled in the art from the accompanying disclosure and description.

By the term "emulsion polymerized polymer" as used throughout this specification and the claims, we mean homopolymers and copolymers prepared by emulsion polymerization.

The homopolymers and copolymers of this invention are produced by emulsion polymerization of conjugated dienes, with or without other monomers, at temperatures generally in the range of —40 to 140° F. Any initiator system can be used, such as the iron-pyrophosphate-hydroperoxide, either sugar-free or containing sugar; the sulfoxylate recipe; the persulfate recipe, and the like. Any suitable emulsifier such as fatty or rosin acid soaps, or the like, can be used. These recipes usually contain 1–9 parts by weight emulsifier per 100 parts of monomers. To prepare liquid polymers, a modifier, such as an aliphatic mercaptan, is employed in an amount sufficient to provide a product of the desired viscosity.

Conjugated diolefins applicable to the preparation of the polymers of this invention include, among others, 1,3-butadiene, isoprene, 2,3-dimethyl-1,3-butadiene, methylpentadiene, piperylene, and others. The conjugated dienes of 4 to 6 carbon atoms are usually employed, although dienes of more than 6 carbon atoms can be used, as well as the various alkoxy, such as methoxy and ethoxy, and cyano derivatives.

The comonomers for use with the conjugated diene include, among others, styrene, alpha-methylstyrene, acrylonitrile, and the vinylpyridines, such as 2-vinylpyridine, 2-methyl-5-vinylpyridine, 3-ethyl-5-vinylpyridine, and the like. In the preparation of the copolymers, the amount of conjugated diene used is generally in the range of 50–98 parts by weight per 100 parts of monomers with the unsaturated comonomer in the range of 50–2 parts.

This invention can be practiced using polymers prepared by any one of several well known emulsison processes. When operating with liquid polymers, the emulsion polymerization can be conducted as described in U.S. Patent 2,469,132 issued to Schulze and Crouch on May 3, 1949; although other procedures and recipes can be employed. In a process of this type, the polymerization of one or more monomers is conducted in an aqueous emulsion. The temperature is usually maintained at about 50° C. The polymerization is generally carried out in the presence of a modifier, such as an aliphatic mercaptan, a suitable emulsifying agent, a polymerization catalyst system comprising persulfates, peroxides, or the like, and other necessary components. After the desired degree of polymerization has been obtained, the reaction mixture is treated to remove any monomers. A conventional steam stripping operation can be used for this purpose. The polymeric reaction product is then broken out of the emulsion by addition of a coagulating agent such as sulfuric acid; whereupon the polymeric material rises to the surface and forms a supernatant oily layer. This oily layer is then separated from the water layer by mechanical means and may or may not be dissolved in a solvent prior to treatment for color removal. The determining factor for the use of a solvent is viscosity of the material, and while this invention can be applied to remove color from undissolved polymer, it is generally more practical to form a solution of the polymer in solvents such as methylcyclohexane, benzene, and the like. The concentrations of polymer in the solution can vary over a wide range, the primary consideration being viscosity of the solution. The high molecular weight liquid polymers and solid polymers are treated in solutions that are quite dilute, for example, 4 weight percent polymer or less. Less viscous liquid polymers are preferably in solution in the range of 8 to 50 weight percent polymer. Naturally, it is desirable that the volume of solution to be treated be held to a minimum. The solvent-polymer solution can then be dried by distillation or treatment with a desiccant, such as anhydrous calcium sulfate, calcium chloride, or the like. It is preferred that the polymer solution be free of water, since this increases the capacity of the adsorbent. It has been shown that the capacity of the adsorbent can be increased as much as 50 percent by predrying the polymer solution.

The polymer solution is then passed through a bed of adsorbent, such as silica gel, sodium aluminate, activated charcoal, or kaolin, for removal of the color bodies; and a water white effluent is obtained. The treatment can be done at any temperature or pressure, although it is preferable from an operational standpoint to use temperatures in the range of 60 to 180° F. A colorless or near colorless polymer is recovered by removal of the solvent in any conventional manner, such as distillation. The adsorbent can be rejuvenated by means known in the art and reused on subsequent polymer solutions. One means of rejuvenation of adsorbents such as silica gel, kaolin, and sodium aluminate is by heating at an elevated temperature, for example in the range of 700 to 800° C., in a stream of air to remove organic material therefrom. Through the practice of this invention, it is possible to produce an emulsion polymerized polymer having a Gardner color of 3 or less. In many instances it is relatively simple to employ this invention to obtain a product with a Gardner color of 1.

Better understanding of this invention will be obtained upon reference to the following examples which are meant to be exemplary and not to be unduly limiting upon the invention.

EXAMPLES

For the examples of this invention, three liquid polymers were prepared by emulsion processes using conventional polymerization equipment and standard procedures. The following polymerization recipes were employed, as shown in Table I.

*Table I.—Polymerization recipes and data*

| Examples | Parts by Weight | | |
|---|---|---|---|
| | A | B | C |
| Component: | | | |
| Water | 180 | 180 | 180 |
| Methanol Rinse | 5 | 2 | 5 |
| Butadiene | 100 | 75 | 100 |
| Methylvinylpyridine | | 25 | |
| Potassium Fatty Acid Soap | 5 | 6 | 5 |
| Potassium Hydroxide | 0.05 | 0.05 | 0.05 |
| Potassium Chloride | 0.3 | 0.2 | 0.3 |
| Sodium Salt of Alkyl Aryl Sulfonic Acid | 0.1 | 0.2 | 0.1 |
| Anhydrous Potassium Pyrophosphate | 0.165 | | 0.165 |
| Ferrous Sulfate Heptahydrate | 0.139 | 0.02 | 0.139 |
| Sodium Formaldehyde Sulfoxylate Dihydrate | | 0.1 | |
| Ethylenediamine Tetraacetic Acid | | 0.04 | |
| para-Menthane Hydroperoxide | 0.095 | 0.1 | 0.095 |
| Tertiary-Dodecyl Mercaptan | 5 | 15 | 5 |
| Sodium Dimethyldithiocarbamate (Shortstop) | 0.15 | | |
| Di-tert-butylhydroquinone (Shortstop) | | 0.2 | 0.2 |
| Polymerization Data: | | | |
| Polymerization Temperature, °F | 41 | 41 | 41 |
| Reaction Time, Hours | 15.8 | 5.8 | 13.5 |
| Conversion, Weight Percent | 69 | 62.1 | 72.1 |

EXAMPLE A

Emulsion polymerized liquid polybutadiene.
SFS viscosity: 6121 at 100° F.

This polymer was coagulated with alcohol and brine. After coagulation, the polymer and serum were dark brown. The polymer was removed and washed three times with isopropyl alcohol, each wash volume being approximately equal to the volume of polymer; but considerable brown color remained. The color of this polymer on the Gardner color scale rated 18. The washed polymer was then dissolved in a methylcyclohexane to form ten gallons of approximately ten weight percent solution. A portion of this solution was filtered through commercial grade silica gel, 200 mesh and finer, at room temperature. After the solvent was flashed off under vacuum, the polymer showed a remarkable color improvement, having a Gardner color of 1. The capacity of the silica gel was 4 to 5 volumes of polymer solution per volume of adsorbent.

EXAMPLE B

Emulsion polymerized liquid butadiene-methylvinylpyridine copolymer.
SFS viscosity: 11,980 at 100° F.

This polymer was separated in the same manner used for Example A, and the liquid product was washed three times with alcohol. The polymer, which had a Gardner color of 10, was then dissolved in methylcyclohexane to yield five gallons of a light yellow solution. Two pounds of silica gel was spread evenly over filter paper in a Buchner funnel to form a layer one inch thick. The five gallons of polymer solution was passed through the silica gel yielding a nearly water white filtrate. After flashing off the solvent, about 3.5 pounds of a light straw-colored polymer with a Gardner color of 2 was recovered.

EXAMPLE C

Emulsion polymerized liquid polybutadiene.

A twenty gallon batch of this polymer was prepared and the polymer was isolated as in the preceding examples. A solution in methylcyclohexane was then prepared to 14.8 weight percent of polymer, and the resulting solution was divided into a number of equal portions and treated as outlined in Table II, samples 1–8. The Gardner color of the untreated sample of polymer was 7. The other samples were treated by passing the polymer solution through a one to one and one-half inch layer of adsorbing agent placed over filter paper in a Buchner funnel. Three samples were dried prior to filtering. Following the treating step, the solvent of each sample was flashed off under vacuum. Data are also included in Table II, samples 9–13, to show the ineffectiveness of this method of color removal for sodium polymerized polymers.

*Table II*

| Sample | Drying Means | Adsorbing Agent | Gardner Color | Ash, Percent |
|---|---|---|---|---|
| 1 | None | None | 7 | 0.09 |
| 2 [1] | Flashing | Silica Gel | 1 | 0.03 |
| 3 | None | do | 1 | 0.01 |
| 4 | Calcium Chloride | do | 4 | 0.72 |
| 5 [2] | do | do | 3 | 1.00 |
| 6 | None | Sodium Aluminate | 2 | 0.82 |
| 7 | do | Activated Charcoal | 1 | 0.05 |
| 8 | do | Kaolin | 1 | 0.03 |
| 9 [3] | do | None | 10 | 0.12 |
| 10 [3] | do | Silica Gel | 10 | 0.09 |
| 11 [3] | do | Activated Charcoal | 10 | 0.09 |
| 12 [3] | do | Sodium Aluminate | 10 | 0.07 |
| 13 [3] | do | Kaolin | 10 | 0.11 |

[1] A portion of the original sample was flashed under vacuum to remove solvent and any moisture and then redissolved in sufficient methylcyclohexane to form a 20% solids solution.
[2] Calcium chloride and silica gel mixed with the polymer solution and filtered.
[3] A sodium polymerized liquid polybutadiene.

Samples 4, 5, and 6 show a higher Gardner color than the other treated samples and also higher ash content. The solutions appeared cloudy and slightly colored indicating that desiccant or adsorbent was not completely filtered from the solutions.

The capacity of the silica gel for the above samples which were not pre-dried was 6.23 pounds of liquid polybutadiene per pound of silica gel. For the pre-dried samples, the capacity of the silica gel was increased to better than 9.88 pounds of polymer per pound of silica gel. This is an increase in capacity of at least 58 percent. A sample of silica gel which had lost its effectiveness for color removal from a wet solution of polymer was oven dried at 180° F. for 24 hours. This redried silica gel then had a color removal capacity for wet polymer solutions of 5.5 pounds of polymer per pound of silica gel.

It is apparent from the above examples that excellent color removal from emulsion polymerized polymers can be achieved through the practice of this invention.

The color improvement of Example A was the maximum detectable on the Gardner scale. The color improvement of Examples B and C, from 10 to 2, and from 7 to 1, respectively, are also remarkable; especially in light of the fact that no detectable color improvement was evidenced by the sodium catalyzed butadiene polymer, samples 9–13, when subjected to the same treatment.

We claim:

1. A method of removing color from a liquid polymer which is a polymerizate of a monomer system comprising a major amount of conjugated diene having from 4 to 6, inclusive, carbon atoms, and which has been formed in a basic aqueous emulsion in the presence of an oxidizing polymerization catalyst and a mercaptan modifier which comprises dissolving said polymer in a hydrocarbon solvent to form a solution having a viscosity less than the polymer itself; contacting said solution with an adsorbent selected from the group consisting of silica gel, sodium aluminate, activated charcoal, and kaolin; separating the solution from said adsorbent; and removing the solvent from the polymer to recover a substantially clear, colorless, liquid polymer.

2. A method of removing color from a liquid polymer according to claim 1 wherein said contacting step is carried out at a temperature in the range of 60° F. to 180° F.

3. A method of removing color from a liquid polymer according to claim 1 wherein said solution contains from 8 to 50 weight percent of said polymer.

4. A process of claim 1 wherein the conjugated diene is copolymerized with other monomers.

5. A process of claim 1 wherein the conjugated diene is 1,3-butadiene.

6. A process of claim 4 wherein the conjugated diene is 1,3-butadiene and the comonomer is 2-methyl-5-vinylpyridine.

7. A method of removing color from a liquid polymer which is a polymerizate of a monomer system comprising a major amount of conjugated diene having from 4 to 6, inclusive, carbon atoms, and which has been formed in a basic aqueous emulsion in the presence of an oxidizing polymerization catalyst and a mercaptan modifier which comprises dissolving said polymer in a hydrocarbon solvent to form a solution having a viscosity less than the polymer itself; drying said solution to remove moisture present; contacting said solution with an adsorbent selected from the group consisting of silica gel, sodium aluminate, activated charcoal and kaolin, the capacity of said adsorbent having been extended by the drying of said polymer solution; separating the solution from said adsorbent; and removing the solvent from the polymer to recover a substantially clear, colorless, liquid polymer.

8. A method of removing color from a liquid polymer which is a polymerizate of a monomer system comprising a major amount of conjugated diene having from 4 to 6, inclusive, carbon atoms, and which has been formed in a basic aqueous emulsion in the presence of an oxidizing polymerization catalyst and a mercaptan modifier which comprises dissolving said polymer in a hydrocarbon solvent to form a solution having a viscosity less than the polymer itself; contacting said solution with a solid adsorbent; separating the solution from said adsorbent; and removing the solvent from the polymer to recover a substantially clear, colorless, liquid polymer.

References Cited in the file of this patent

UNITED STATES PATENTS

| | | |
|---|---|---|
| 2,132,711 | Voorhees | Oct. 11, 1938 |
| 2,469,132 | Schulze et al. | May 3, 1949 |
| 2,641,620 | Quelly et al. | June 9, 1953 |
| 2,753,382 | Hamner | July 3, 1956 |
| 2,775,632 | Honeycutt et al. | Dec. 25, 1956 |